United States Patent [19]
Pitchaikani et al.

[11] Patent Number: 6,061,505
[45] Date of Patent: May 9, 2000

[54] APPARATUS AND METHOD FOR PROVIDING TOPOLOGY INFORMATION ABOUT A NETWORK

[75] Inventors: Balaji Pitchaikani; Suresh Viswanathan; Kamlesh Mehta, all of Santa Clara; Chen-Yea Luo, Sunnyvale; Gilbert Ho, Cupertino, all of Calif.

[73] Assignee: Nortel Networks Corporation, Montreal, Canada

[21] Appl. No.: 08/279,196

[22] Filed: Jul. 22, 1994

[51] Int. Cl.[7] .................................................. G06F 15/173
[52] U.S. Cl. ............................ 395/200.56; 395/200.59; 707/10
[58] Field of Search ................................. 395/159, 140, 395/161, 200, 600, 200.48, 200.44, 200.5, 200.54, 200.56, 200.59; 707/10; 711/100

[56] References Cited

U.S. PATENT DOCUMENTS

| | | | |
|---|---|---|---|
| 4,644,532 | 2/1987 | George et al. | 370/94 |
| 4,825,206 | 4/1989 | Brice, Jr. et al. | 340/825.02 |
| 5,049,873 | 9/1991 | Robins et al. | 340/825.06 |
| 5,084,870 | 1/1992 | Hutchison et al. | 370/94.1 |
| 5,101,348 | 3/1992 | Arrowood et al. | 395/200 |
| 5,226,120 | 7/1993 | Brown et al. | 395/200 |
| 5,261,044 | 11/1993 | Dev et al. | 395/159 |
| 5,276,789 | 1/1994 | Besaw et al. | 395/140 |
| 5,295,244 | 3/1994 | Dev et al. | 395/161 |
| 5,307,484 | 4/1994 | Baker et al. | 395/600 |
| 5,353,399 | 10/1994 | Kuwamoto et al. | 395/159 |
| 5,371,848 | 12/1994 | Casey et al. | 395/161 |
| 5,384,768 | 1/1995 | Fujii | 370/14 |

*Primary Examiner*—Jean R. Homere
*Attorney, Agent, or Firm*—Blakely, Sokoloff, Taylor & Zafman LLP

[57] ABSTRACT

A method and apparatus for providing information about the logical and physical connections between devices on a network. The apparatus includes a storage access unit coupled to a storage device. The storage device stores a database of connectivity information. Various applications which display network information request the information from the storage access unit. The storage access unit supplies the information to the applications based on information contained in the connectivity database. The connectivity database is incrementally built and updated as information is acquired from devices on the network in response to requests for information not currently stored in the database.

26 Claims, 4 Drawing Sheets

APPARATUS AND METHOD FOR PROVIDING TOPOLOGY INFORMATION ABOUT A NETWORK

FIELD OF INVENTION

The present invention relates to storing and providing information about a network, and more specifically, to a method and apparatus for storing and supplying information about the physical and logical topology of a network.

BACKGROUND OF THE INVENTION

A computer network generally consists of a plurality of networked devices physically connected to each other through some communication medium, such as a copper or fiber optic cable. Networked devices typically include, for example, computer workstations, hubs or concentrators, bridges and routers. As networks become increasingly complex, it becomes increasingly important to keep track of the various devices on a network and how they are interconnected. Such interconnection information is referred to herein as the topology of the network.

A network may be perceived either logically or physically. A network can be perceived logically as a group of logical devices communicating through logical communication links. In contrast, most human network users perceive a network physically (i.e. as a group of physical devices, located in physical locations, connected by physical cables). Typically, the logical topology of a network does not correspond exactly to the physical topology of the network. For example, a single physical device may constitute a plurality of logical devices. Similarly, a single physical cable may carry signals for a plurality of logical communication links.

In the past, applications have been developed which determine and display the logical topology of a network. Unfortunately, the information communicated by these displays may not be very helpful in repairing certain problems. For example, the termination of a logical link between two logical devices may indicate a hardware error in a physical device. However, before the error may be repaired, the physical devices corresponding to the logical devices must be determined. Since there is not always a one-to-one correspondence between physical devices and logical devices, this determination may not be straightforward. Further, once the appropriate physical devices have been determined, they must be located. A logical map typically identifies logical devices by logical addresses or logical identification numbers. These addresses generally do not convey information about the physical location of the physical device corresponding to the logical device.

Consequently, one strategy has been developed for determining and displaying the physical topology of a network. Such a strategy is described, for example, in U.S. Pat. No. 5,226,120 issued to Brown et al. on Jul. 6, 1993. According to this strategy, a control console adapter creates an "ancestor table" indicating how each concentrator in a network system is related to a "root" concentrator. A topology display showing the relationships between the various concentrators and the root concentrator may be generated based on the ancestor table.

However, other types of topology displays may be more helpful than an ancestor tree display for certain network monitoring and debugging operations. Other topology display formats are disclosed, for example, in U.S. patent application Ser. No. 08/279,490 entitled "Nodal View User Interface For Network Management" filed on the same day herewith. Therefore, it is clearly desirable to provide a variety of network management station applications ("NMS applications") for displaying physical and logical topology maps in a variety of formats. Unfortunately, the structure and contents of the ancestor table is specifically directed to an ancestor tree display. The generation of other topology display formats, such as logical displays, based on the ancestor table would be difficult or impossible. Further, the incorporation of ancestor table-building functionality into a plurality of NMS applications would result in a wasteful duplication of data and functionality.

In light of the foregoing, it is clearly desirable to provide a method and apparatus for displaying the physical and logical topology of a network in a variety of formats. Further, it is clearly desirable to provide a method and apparatus for supplying device connectivity information to a plurality of NMS applications, from which the plurality of NMS applications may generate various types of topology displays. Finally, it is clearly desirable to provide a method and apparatus for creating and maintaining a single, central device connectivity database accessible to the variety of NMS applications.

SUMMARY OF THE INVENTION

According to one aspect of the present invention, an apparatus for providing connectivity information about a network is provided. The network includes a plurality of devices. The apparatus includes a storage device, a plurality of physical connectivity records, a plurality of logical connectivity records and a storage access unit.

The plurality of physical connectivity records are stored on the storage device. The plurality of physical connectivity records represents the plurality of devices and physical connections between the plurality of devices. The plurality of logical connectivity records are also stored on the storage device. The plurality of logical connectivity records represents the plurality of devices and logical connections between the plurality of devices.

The storage access unit is coupled to the storage device. The storage access unit receives a request for connectivity information. The request is a request for physical connectivity information or logical connectivity information. The storage access unit accesses the plurality of physical connectivity records on the storage device and generates a signal containing physical connectivity information when the request is a request for physical connectivity information. The storage access unit accesses the plurality of logical connectivity records on the storage device and generates a signal containing logical connectivity information when the request is a request for logical connectivity information.

The network includes a plurality of interfaces. Each interface of the plurality of interfaces belongs to a corresponding device of the plurality of devices. The physical connectivity records includes a plurality of device records, a plurality of interface records, and a plurality of link records. Each device record of the plurality of device records represents a specified device of the plurality of devices. Each interface record of the plurality of interface records represents a specified interface of the plurality of interfaces. Each link record of the plurality of link records represents a connection between a connected set of interfaces of the plurality of interfaces.

The plurality of logical connectivity records include a plurality of view records. Each view record corresponds to a logical view of the network. The logical connectivity records further include a plurality of view device records. Each view device record is associated with a corresponding view record. Each view device record contains an index of interfaces which exist in a logical view of the network represented by the corresponding view record.

According to another aspect of the invention, a method for providing connectivity information about a network is provided. The network includes a plurality of devices. According to one embodiment of the method, a storage device is provided. A plurality of physical connectivity records is stored on the storage device. The plurality of physical connectivity records represents the plurality of devices and physical connections between the plurality of devices. A plurality of logical connectivity records is also stored on the storage device. The plurality of logical connectivity records represents the plurality of devices and logical connections between the plurality of devices.

A request for connectivity information is received. The request is a request for physical connectivity information or logical connectivity information. The plurality of physical connectivity records on the storage device are accessed and a signal containing physical connectivity information is generated when the request is a request for physical connectivity information. The plurality of logical connectivity records on the storage device is accessed and a signal containing logical connectivity information is generated when the request is a request for logical connectivity information.

The network includes a plurality of interfaces. Each interface of the plurality of interfaces belongs to a corresponding device of the plurality of devices. Storing the plurality of physical connectivity records includes storing a plurality of device records, a plurality of interface records and a plurality of link records. Each device record of the plurality of device records represents a specified device of the plurality of devices. Each interface record of the plurality of interface records represents a specified interface of the plurality of interfaces. Each link record of the plurality of link records represents a connection between a connected set of interfaces of the plurality of interfaces.

Storing the plurality of logical connectivity records includes storing a plurality of view records. Each view record corresponds to a logical view of the network. Storing the logical connectivity records further includes storing a plurality of view device records. Each view device record is associated with a corresponding view record. Each view device record contains an index of interfaces which exist in a logical view of the network represented by the corresponding view record.

According to one embodiment, the various records are associated with related records by a plurality of pointers. For example, a device record representing a given device is associated with each interface record that represents an interface belonging to that device by a plurality of pointers. The various records and pointers constitute a database. The database is updated incrementally as various NMS applications request connectivity data. If the requested connectivity data is not currently in the database, the device status data is acquired and the connectivity data is generated. The connectivity data is then sent to the NMS application that requested the data and stored in the database.

BRIEF DESCRIPTION OF THE DRAWINGS

The invention may best be understood by referring to the following description and accompanying drawings which illustrate the invention. In the drawings:

FIG. 3b is a block diagram of a second portion of the database shown in FIG. 3a.

DETAILED DESCRIPTION OF THE PREFERRED EMBODIMENT

Figure 1:
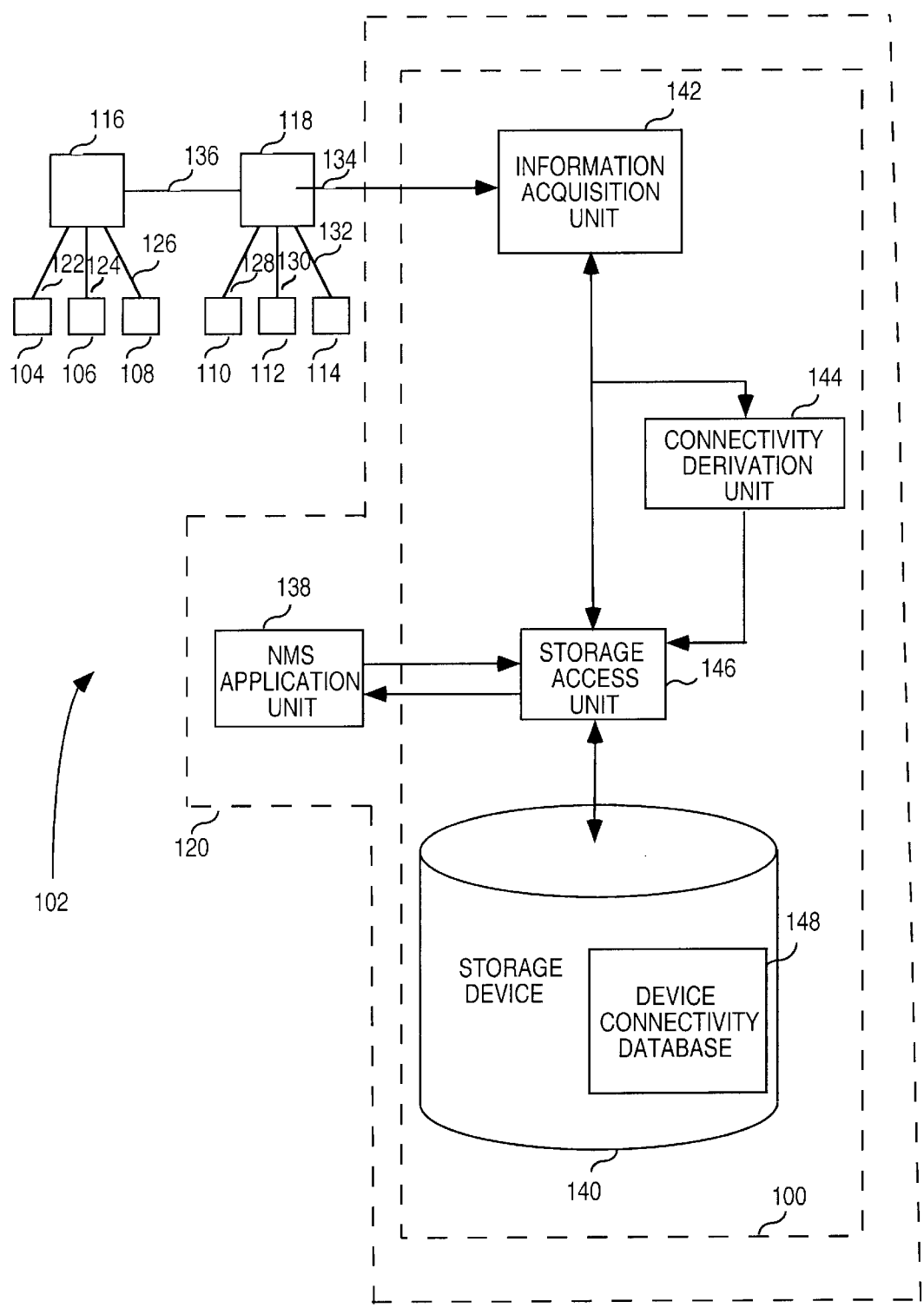
FIG. 1 is a block diagram of a network management station employing the present invention.

Referring now to FIG. 1, it illustrates a device connectivity information unit ("DCIU") 100 for providing device connectivity information about an exemplary network system 102 according to an embodiment of the present invention. The network system 102 generally includes a plurality of stations 104, 106, 108, 110, 112, 114, 116, 118 and 120 connected by a plurality of physical connections 122, 124, 126, 128, 130, 132, 134 and 136. Stations 104, 106, 108, 110, 112 and 114 are workstations and stations 116 and 118 are concentrators. Workstations 104, 106 and 108 are physically coupled to concentrator 116 through lines 122, 124 and 126, respectively. Workstations 110, 112, and 114 are physically coupled to concentrator 118 through physical lines 128, 130 and 132, respectively. Concentrator 116 is physically coupled to concentrator 118 through physical line 136, and concentrator 118 is connected to station 120 through line 134.

Station 120 is preferably a network management station ("NMS") used by a network administrator to monitor and debug the network system 102. NMS 120 includes DCIU 100 and an NMS application unit 138. The DCIU includes a storage device 140, an information acquisition unit 142, a connectivity derivation unit 144 and a storage access unit 146.

Storage device 140 generally represents one or more mechanisms for storing information. For example, storage device 140 may include random access memory and a disk drive. Storage device 140 is connected to storage access unit 146 and stores device connectivity information in a device connectivity database 148. The structure and contents of device connectivity database 148 shall be described in greater detail hereafter with reference to FIGS. 2, 3a and 3b.

The information acquisition unit 142 is coupled to concentrator 118 over line 134, to connectivity derivation unit 144, and to storage access unit 146. The information acquisition unit 142 is configured to retrieve station status information from each station of stations 104, 106, 108, 110, 112, 114, 116, 118 and 120. As will be explained hereafter, the station status information thus retrieved is used to build and update device connectivity database 148. Station status information for a given station includes, for example, the state of the station, the interfaces on the station, and configuration data.

Typically, station status information does not include connectivity information. However, connectivity information can be derived based on station status information. Connectivity derivation unit 144 receives the station status information from information acquisition unit 142 and derives connectivity information therefrom. Various methods for deriving connectivity information from station status information have been developed. For example, connectivity derivation unit 144 may derive connectivity information based on databases maintained in concentrators 116 and 118 according to the method described in U.S. Pat. No. 5,226,120 issued to Brown et al. on Jul. 6, 1993. Another method for deriving connectivity information from station status information is described in U.S. patent application Ser. No.

08/262,150, filed on Jun. 20,1994, entitled "Method and Apparatus for Mapping the Physical Topology Mapping of FDDI Networks". Once connectivity derivation unit 144 has derived the connectivity of network 102, the connectivity information is sent to storage access unit 146.

Storage access unit 146 is coupled to the connectivity derivation unit 144, the information acquisition unit 142, and the storage device 140. The storage access unit 146 is configured to receive the device connectivity information from the connectivity derivation unit 144 and the station status information from information acquisition unit 142 and to construct or update device connectivity database 148 based upon this information.

NMS application unit 138 is coupled to storage access unit 146. NMS application unit generally represents an NMS application executing on a processor. When the NMS application requires information about the status or connectivity of a device on network 102, the NMS application unit transmits a query requesting the information to storage access unit 146. Storage access unit 146 accesses database 148 to determine if the requested information is stored in the database 148. If the requested information is stored in the database 148, storage access unit 146 retrieves the requested information from the database 148 and transmits the information to the NMS application unit 138.

If the requested information is not stored in the database 148, storage access unit 146 causes information acquisition unit 142 to retrieve the appropriate information from the specified device. If connectivity information that is not stored in database 148 is requested, then information acquisition unit 142 requests the station status information needed to derive the connectivity information, and connectivity derivation unit 144 derives the connectivity information from the retrieved station status information. If the information requested by NMS application unit 138 was not stored in database 148, then storage access unit 146 forwards the requested information to NMS Application unit 138 once it has been retrieved or derived, and updates database 148 based on the information.

By maintaining a single, central device connectivity database 148, each NMS application that uses or displays device connectivity information need not maintain its own separate database. Since each NMS application unit need not construct its own device connectivity database, less complex and less expensive NMS applications may be developed.

Further, each NMS application may take advantage of connectivity data acquired in response to previous queries made by other NMS applications. For example, if an NMS application requires information about the interfaces on station 104, and this information is not currently stored in database 148, the information will be retrieved from station 104, sent to the NMS application, and stored in device connectivity database 148. When a second NMS application unit requires the same information, the information is retrieved directly from database 148 by storage access unit 146. Since station 104 does not have to be accessed to service the second request, traffic over network 102 is reduced. Further, as described above, device connectivity database 148 is constructed and modified as information is actually needed by NMS applications. As a result, network management station 120 need not be tied up in the task of constructing a complete device connectivity database upon the initialization of network 102.

However, for some applications, it may be desirable to construct all or part of device connectivity database 148 upon initialization of network 102. Consequently, information acquisition unit 142 will only have to access devices over the network when the information in database 148 needs to be updated. The information in database 148 will need to be updated, for example, if the connectivity of one or more of the devices on the network 102 changes.

Another advantage of having a single, central device connectivity database 148 is that the database 148 may reflect information supplied by a variety of applications. For example, information acquisition unit 142 may execute a variety of information acquisition applications, each of which is designed to acquire different types of information from the devices on network 102. Rather than have each of the information acquisition applications create its own separate database, the information is sent to storage access unit 146 and incorporated into database 148. As a result, all of the NMS applications may easily access all of the information gathered by all of the information acquisition programs.

Figure 2:
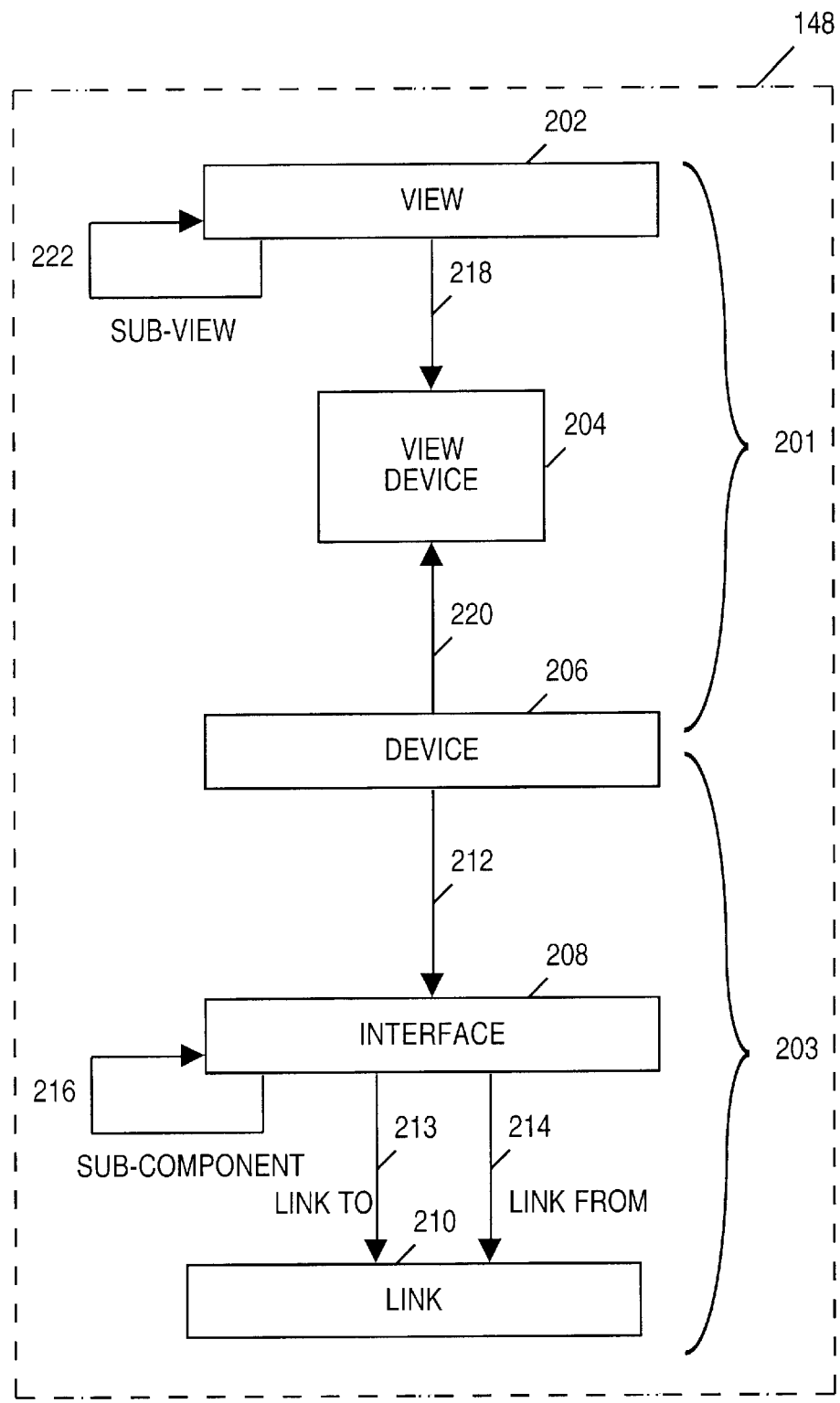
FIG. 2 is a block diagram of the core records and links of a connectivity database according to the present invention.

Referring now to FIG. 2, it illustrates in block diagram form the structure of database 148 which serves as a control repository for device connectivity information. Database 148 stores information in a network database structure. Because database 148 employs a network database structure, the data records contained therein can point to more than one other record and, conversely, can be pointed to by one or more records. Database 148 generally includes a plurality of logical connectivity records and pointers 201 and a plurality of physical connectivity records and pointers 203. Logical connectivity records and pointers 201 include a plurality of view records 202 and a plurality of view device records 204. Physical connectivity records and pointers 203 include a plurality of device records 206, a plurality of interface records 208 and a plurality of link records 210.

Each device on network 102 is uniquely represented by data stored in a corresponding device record of device records 206. Preferably, each device record includes data for the fields illustrated in Table 1. In the Tables included herein, the phrase "Reserved" is used to indicate that a specific function has not yet been ascribed to a field.

TABLE 1

| Field | Description |
| --- | --- |
| u1DevicedBID | A device identifier generated by the Database |
| byMaxInterfaceNum | Maximum number of interfaces that the device supports |
| abyNetAddr[11][1] | The logical address of the device. The address of the primary interface in the event that multiple interfaces are present on the device. |
| abyPrimaryMacAddr[6][1] | The physical address of the primary interface |
| szName[22] | A user-friendly name associated with the device |
| u1VendorTypeDBID | An identifier indicating the type of device e.g., bridge, concentrator etc. that is generated by the database |

TABLE 1-continued

| Field | Description |
| --- | --- |
| ulVendorDBID | A vendor identifier that is generated by the database |
| lBootTime | The time the device was powered up |
| szUserSymbolName[40] | This is the name of the symbol that the user wants to use to represent the device. |
| ulStRcDBID | A database identifier for the record that contains the static information pertaining to this device |
| ulStInstDBID | A database identifier that identifies the record instance that pertains to the static information of this device |
| ulDyRcDBID | A database identifier for the record that contains the dynamic information pertaining to this device |
| ulDyInstDBID | A database identifier that identifies that record instance that pertains to the dynamic information of this device |
| lTimeStamp | A time stamp indicating the last update of the record |

Each interface on each device on network 102 is uniquely represented by data stored in an interface record of interface records 208. Preferably, each interface record includes data for the fields illustrated in Table 2.

would be associated with an interface record of interface records 208 representing interface A and an interface record of interface records 208 representing interface B, by device-to-interface pointers 212.

TABLE 2

| Field | Description |
| --- | --- |
| ulInterfaceTypeDBID | A database generated identifier for the type of the interface |
| ulMediaTypeDBID | A database key that identifies the type of media. |
| byInterfaceNum | This is the number associated with the interface, it could be set to be the slot number. |
| abyNetAddr[11][1] | This is the network address associated with the interface. |
| abyMACAddr[6][1] | This is the physical MAC address associated with the interface |
| abySegmentName[11][1] | Reserved |
| ulVendorDBID | A vendor identifier that is generated by the database |
| szUserSymbolName[40] | This is the name of the symbol that the user wants to use to represent the interface. |
| byInterfaceStatus | This indicates the status of the interface (e.g. Up/Down/Degrading) |
| byManageable | This indicates how the interface can be managed ie.SNMP, ICMP, IPX test etc. |
| byTopoManaged | This indicates whether the interface is manageable from a topology perspective, 0 for NMM, 1 for other |
| ulStRcDBID | A database identifier for the record that contains the static information pertaining to this interface |
| ulStInstDBID | A database identifier that identifies the record instance that pertains to the static information of this interface |
| ulDyRcDBID | A database identifier for the record that contains the dynamic information pertaining to this interface |
| ulDyInstDBID | A database identifier that identifies the record instance that pertains to the dynamic information of this interface |
| byLevel | This field is used to store the NMM level information received in Segment maps |
| lTimeStamp | A time stamp indicating the last update of the record |

Each device record of device records 206 is associated with one or more interface records of interface records 208 by a plurality of device-to-interface pointers 212. Specifically, a device record representing a given device is associated with the interface records representing the interfaces contained in the given device. For example, if station 104 contains an interface A and an interface B, then the device record of device records 206 representing station 104

Each link record of link records 210 represents a link between two interfaces. For example, link records 210 would include a link record corresponding to line 122, which couples an interface on station 104 with an interface on concentrator 116. Link records 210 include a link record corresponding to each line of lines 122, 124, 126, 128, 130, 132, 134 and 136. Preferably, each link record of link records 210 includes data for the fields illustrated in Table 3.

TABLE 3

| Field | Description |
| --- | --- |
| abyMACAddrSelf[6][1]* | This is the MAC address associated this the interface to which this link record is associated |

TABLE 3-continued

| Field | Description |
| --- | --- |
| bySlotSelf | This is the slot number in the interface associated with the link record |
| byPortSelf | This is the port number in the interface associated with the link record |
| bySlotModuleTypeSelf | Reserved |
| abyMACAddrLink[6][1] | This is the MAC address associated with the interface at the other end of the link |
| abyNetAddrParent[11][1] | Reserved |
| bySlotLinkParent | This is the slot number in the interface at the other end of the link (parent) |
| byPortLinkParent | This is the port number in the interface at the other end of the link (parent) |
| byConnectivityType | This indicates the type of the connectivity e.g. . . . bridge, router . . . |
| byLinkStatus | This indicates the status of a link e.g. . . . Up, Down, New, Discovered . . . |
| lTimeStamp | A time stamp indicating the last update of the record |

Many networks have a predetermined direction of information flow. For example, in a token-passing network, a token flows through the network in a predefined path. Each network entity along the predefined path receives information through one or more interfaces and transmits information through one or more interfaces. An interface which transmits the token to another interface is considered "upstream" from that interface. Conversely, an interface which receives the token from another interface is considered "downstream" from that interface.

The physical lines which connect the interfaces represented in interface records 208 are represented by a plurality of link records 210. For example, line 122 may be represented in a link record of link records 210. The link record representing a given line is linked to the interface records representing the interfaces connected to the given line. This link-record-to-interface-record relationship is represented by one or more link-to pointers 213 and one or more a plurality of link-from pointers 214. Link-from pointers 214 are used to associate link records with interface records representing upstream interfaces, and link-to pointers are used to associate link records with interface records representing downstream interfaces.

For example, assume that line 122 links an interface A in station 104 with an interface B in concentrator 116. Assume also that the token flows from interface A to interface B. Thus, interface A would be upstream with respect to interface B. Consequently, the link record of link records 210 representing line 122 would be associated with the interface record representing interface A by a link-from pointer, and associated with the interface record representing interface B by a link-to pointer.

Each interface may include a plurality of subcomponents which are also interfaces. To reflect this relationship between the interfaces, database 148 includes a plurality of subcomponent pointers 216. Each interface record of interface records 208 which represents an interface having subcomponent interfaces is associated with the interface records of interface records 208 which represent those interface subcomponents by pointers 216.

Through physical connectivity records and pointers 203, physical connectivity data representing all of the physical connections between every device on network 102 may be represented. Consequently, NMS applications which generate physical connectivity maps may acquire all of the data which they need to generate such maps from database 148 through storage access unit 146.

While physical connectivity records and pointers 203 represent the physical connectivity of the devices on network 102, logical connectivity records and pointers 201 represent the logical connectivity of the devices on network 102. Specifically, each view record of view records 202 represents a way in which network 102 may be viewed logically (a "logical view"). Preferably, each view record of view records 202 includes data for the fields illustrated in Table 4.

TABLE 4

| Field | Description |
| --- | --- |
| u1ViewDBID* | A database key that identifies the view. This is a unique key. |
| u1ViewTypeDBID | A database key that identifies the type of view |
| abyViewAddr* | Address of a logical device that is part of the view |
| szViewName | The name associated with the view |
| szViewDesc[40] | A description of the view |
| byViewChangedFlag | This flag indicates whether the view has changed since it was written to the database |
| wNetworkType | The type of network corresponding to the view |
| lTimeStamp | A time stamp indicating the last update of the record |

As mentioned above, viewed logically, each physical device on network 102 may constitute one or more logical devices. A logical view may also differ from a physical view in that a logical view may consist of only a portion or segment of the entire network 102. Each view record of view records 202 includes information about a given logical view, and is connected by a plurality of pointers 218 to a plurality of view device records 204.

Each view device record of view device records 204 contains an index that indicates which device interfaces exist in a particular logical view. The view record of view records 202 representing a given logical view is associated with the view device records of view device records 204 that contain indexes illustrating which interfaces exist in that given logical view.

Each device record of device records 206 is also associated with one or more view device record of view device records 204 by a plurality of pointers 220. Specifically, a device record of device records 206 which represents a given device is associated with the view records of view records 202 which contain indexes indicating which interfaces of the given device exist in the various logical views.

Each view represented in view records 202 may have one or more subviews. For example, one view may be of the entire network 102. A subview of the entire network view may be a view of concentrator 116 and the stations 104, 106 and 108 which are connected to it. A subview of that subview may be a view of station 104 alone. Even the view of station 104 may have its own subview, such as a view showing the status of an interface contained in station 104. To represent this relationship between various views, a plurality of pointers 222 associates each view record of view records 202 that represents a view having a subview with the view records in view records 202 which represent the one or more subviews.

An NMS application which uses or displays a logical topology map of network 102 need not construct its own logical connectivity map. Rather, it simply transmits a signal indicating a logical view to storage access unit 146. In response, storage access unit 146 retrieves data contained in the view record of view records 202 corresponding to the indicated logical view. The view information thus retrieved indicates which devices in network 102 are displayed in the selected logical view, and how the various devices should be displayed (e.g. which interfaces on the various devices should be displayed). In effect, the logical connectivity records and pointers 201 indicate to storage access unit 146 how to interpret and filter the information contained in the physical connectivity records and pointers 203 of database 148 based on the selected logical view. Storage access unit 146 then retrieves logical connectivity information from the physical connectivity records responsive to the selected logical view and transmits the logical connectivity information to the requesting NMS application.

Because both the logical and physical connectivity information for network 102 are stored in a single, central database, each NMS application which displays or uses topology information for network 102 does not have to go through the process of collecting and organizing its own topology information.

Preferably, database 148 is updated incrementally as various NMS applications request information that is not currently stored in database 148. As explained above, every time an NMS application requires information that is not currently stored in database 148, the information is acquired and both sent to the requesting NMS application and stored into database 148. As more and more information is requested by various NMS applications, the information contained in database 148 increases, and the likelihood that an NMS application requires information not currently stored in database 148 decreases.

Figure 3A:
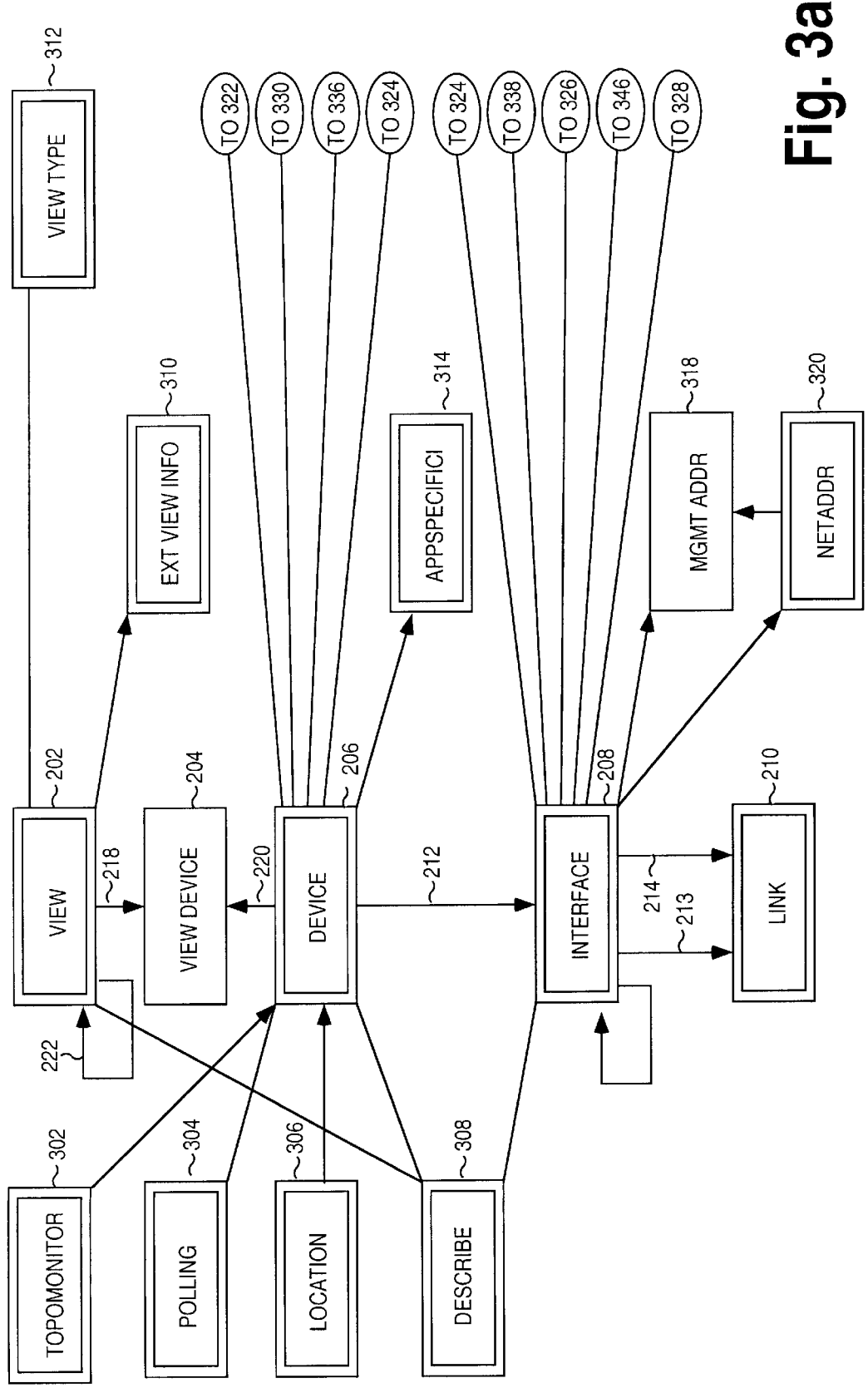
FIG. 3a is a block diagram of a portion of a connectivity database according to an embodiment of the invention.
Figure 3B:
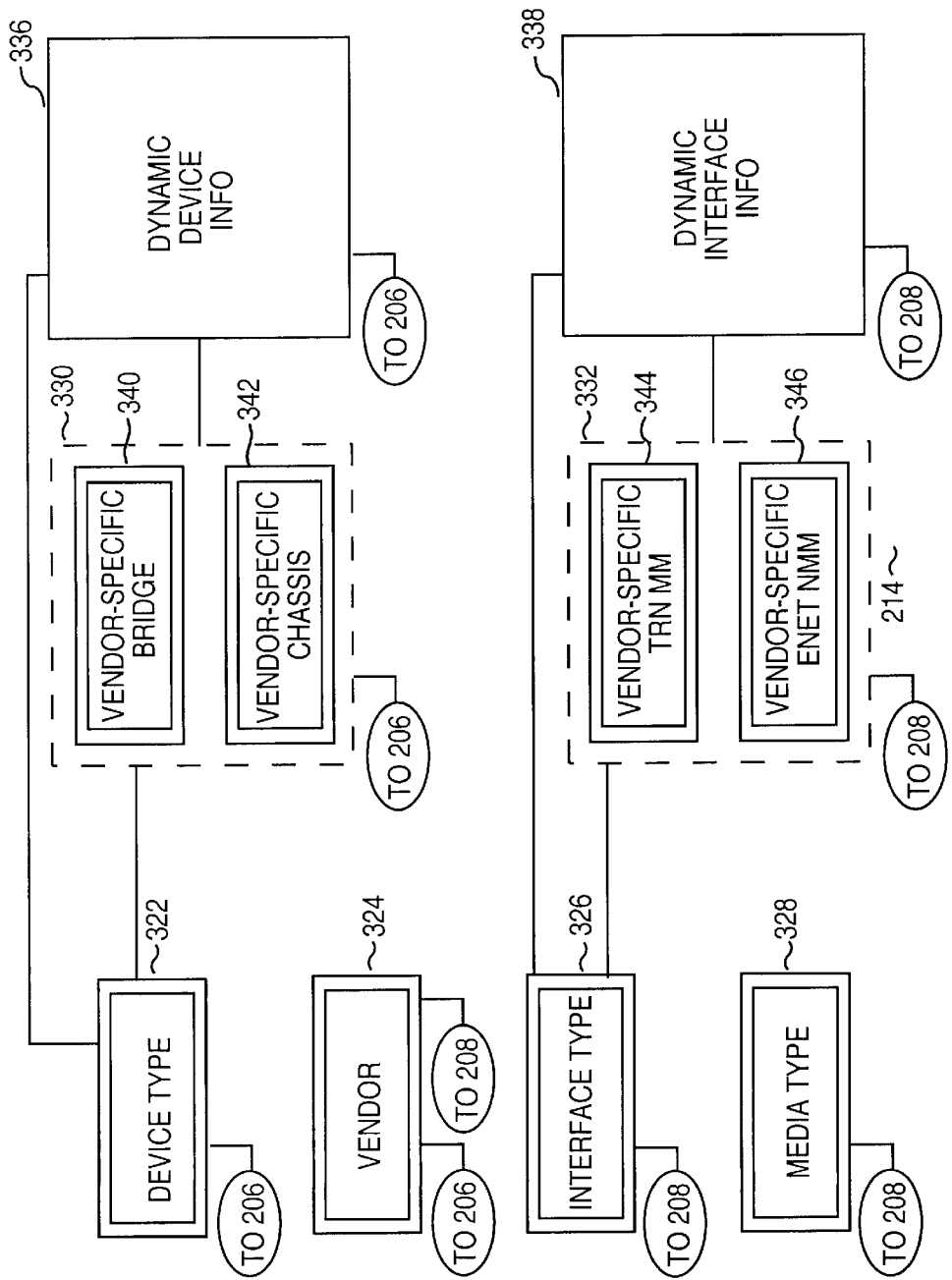

Turning now to FIGS. 3a and 3b, they illustrate a topology database 148 according to the presently preferred embodiment of the invention. As discussed above, the core of database 148 includes view records 202, view device records 204, device records 206, interface records 208 and link records 210. However, in addition to these records, database 148 includes TopoMonitor records 302, Polling records 304, Location records 306, Describe records 308, ExtView Info records 310, AppSpefcificinfo records 314, Mgmt Addr records 318, NetAddr records 320, View Type records 312, Device Type records 322, Vendor records 324, Interface Type records 326, Media Type records 328, Static Device Information records 330, Static Interface Information records 332, Dynamic Device Information records 336 and Dynamic Interface Information records 338. Static Device Information records 330 include Vendor-specific Bridge records 340 and Vendor-specific Chassis records 342. Static Interface Information records include Vendor-specific TRNMM records 344 and Vendor-specific EnetNMM records 346.

TopoMonitor records 302 include information for polling devices in a given logical subnet. Each TopoMonitor is linked to one or more device records. Preferably, each TopoMonitor record includes data for the fields illustrated in Table 5.

TABLE 5

| Field | Description |
|---|---|
| lStartTime | Time to start the device polling |
| lStopTime | Time to stop the device polling |
| wTopMntrTransID | The identifier of the transaction. |
| szViewName[ ] | The name of the view for which this topo-monitoring record is pertinent |
| byIsDispatchNMM | Indicator of whether the NMM is a dispatch NMM |
| *abyRepNMM40NetAddr[11] | The network address of the Representative NMM. |

Polling records 304 include information pertaining to polling a device. These records contain information about devices to be polled. Each Polling record is linked to a corresponding device record. Preferably, each polling record includes data for the fields illustrated in Table 6.

TABLE 6

| Field | Description |
|---|---|
| byPollingType | The polling type i.e. . . . device polling/topology monitoring |
| lStartTime | Time to start the device polling |
| lStopTime | Time to stop the device polling |
| wPollingTransID | The identifier of the transaction. |

Location records 306 include information pertaining to the physical location of devices, together with information about who to contact about the devices. Each Location record is linked to one or more device records. Preferably, each location record includes data for the fields illustrated in Table 7.

TABLE 7

| Field | Description |
|---|---|
| szDescription[40] | This provides the physical location - address, building/floor . . . |
| szContact[40] | This indicates the name of the person to contact with respect to the device |
| szContactDesignation[40] | This is the designation of the person who is a contact point for the given device. |
| szContactTelNum[20] | This is the telephone number for the contact person |
| lTimeStamp | A time stamp indicating the last update of the record |

Describe records 308 include information pertaining to views, devices and interfaces. Each Describe record is linked to a corresponding view, device, or interface record. Preferably, each Describe record includes data for the fields shown in Table 8.

TABLE 8

| Field | Description |
|---|---|
| szRdCommunityString[80] | The SNMP community string - Read only |
| szWrCommunityString[80] | The SNMP community string - Read Write |
| wPollingInterval | The value of the polling interval to be used |

TABLE 8-continued

| Field | Description |
|---|---|
| byMgmtType | The type of management requested (SNMP, ICMP, IPX, echo test . . . ) |
| wTimeOut | The value of the time out period |
| szNotePad[80] | General comments and information |
| u1DescribeRcDBID* | A key to identify this particular record |
| lTimeStamp | A time stamp indicating the last update of the record |

ExtView Info records 310 include information pertaining to view records. This record is used by applications to store any specific information about a view record. Each ExtView Info record is linked to a corresponding view record. Preferably, each ExtView Info record includes data for the fields shown in Table 9.

TABLE 9

| Field | Description |
|---|---|
| szAppName | Name of the application storing the information |
| szInfo | Application specific information |
| lTimeStamp | A time stamp indicating the last update of the record |

AppSpecificinfo records 314 include information pertaining to specific software applications which run on network devices. Each AppSpecicinfor record represents information about the device and pertaining to a specific software application. Preferably, each AppSpecificinfo record includes data for the fields shown in Table 10.

TABLE 10

| Field | Description |
|---|---|
| sxAppName[80] | Name of the application storing the information |
| szInfo[40] | Application specific information |
| lTimeStamp | A time stamp indicating the last update of the record |

MgmtAddr records 318 are intermediate database records which link interfaces to the logical addresses that can be used to manage that interface. Each interface record is linked to one or more MgmtAddr records.

NetAddr records 320 include information pertaining to the network address of interfaces. Each interface record is linked to one or more NetAddr records, and each NatAddr record is linked to zero or more MgmtAddr records. Preferably, each NetAddr record includes data for the fields shown in Table 11.

TABLE 11

| Field | Description |
|---|---|
| NetAddr[11][1] | The logical address |
| lTimeStamp | A time stamp indicating the last update of the record |

View Type records 312 include information pertaining to the view-type of various view. Each View Type record specifies a view-type and is linked to the view records which represent views of the specified view-type. Preferably, each View Type record includes data for the fields shown in Table 12.

TABLE 12

| Field | Description |
|---|---|
| u1ViewTypeDBID* | A database key that identifies the view type |
| szViewTypeDesc[40] | A description of the view type |
| szBoundingProtocol[40] | The protocols that de-limit the view. |
| szBoundingServices[40] | The services that bound the view. |

Device Type records 322 include information pertaining to the device-type of devices. Each Device Type record specifies a particular device-type and is linked to all device records which represent devices of the specified device-type. Preferably, each Device Type record includes data for the fields shown in Table 13.

TABLE 13

| Field | Description |
|---|---|
| u1DeviceTypeDBID* | A database key that identifies the device type |
| szDeviceName[40] | A name of the device |
| szDeviceDesc[40] | A description of the device |
| szGenericSymbolName[40] | The name of the symbol to be used for representing unidentified devices of this type. |
| u1StRcDBID | A database record identifier to be used to index to records containing further information |

Vendor records 324 include information pertaining to the vendors of network devices. Each Vendor record specifies a vendor and is linked to the device records and interface records which represent devices and interfaces sold by the specified vendor. Preferably, each Vendor record includes data for the fields shown in Table 14.

TABLE 14

| Field | Description |
|---|---|
| u1VendorDBID* | The database key that identifies the vendor |
| szVendorName[ ] | The name of the vendor |
| szVendorDesc[ ] | A description of the vendor |
| abyMACAddr[ ][1] | The physical address series allocated to the vendor |
| szSymbolName[40] | A symbol used to represent the vendors device on the user interface |
| u1VendorEnt1D | The vendor enterprise ID |

Interface Type records 326 include information pertaining to interface-types. Each Interface Type record specifies an interface-type and is linked to all interface records which represent interfaces of the specified interface-type. Preferably, each Interface Type record includes data for the fields shown in Table 15.

TABLE 15

| Field | Description |
|---|---|
| u1InterfaceTypeDBID* | The database key that identifies the interface type |
| szIntTypeName[40] | The name of the interface |
| szIntTypeDesc[40] | The interface description |
| u1StRcDBID | A database record identifier to be used to index to records containing further information |
| u1VendorDBID | The database key that identifies the vendor |

Media Type records 328 include information pertaining to the types of media over which interfaces communicate. Each Media Type record specifies a media-type and is linked to all interface records which represent interfaces which communicate over the specified media-type. Preferably, each Media Type record includes data for the fields shown in Table 16.

TABLE 16

| Field | Description |
| --- | --- |
| ulMediaTypeDBID* | The database key that identifies the media |
| szMediaName[40] | The media name |
| byMediaType | the media type identifier |
| szMediaDesc[40] | The description of the media. |

Static Device Information records 330 include information pertaining to the static attributes of various models of certain types of devices. These records contain information that characterizes certain devices. In the presently preferred embodiment, Static Device Information records 330 include Vendor-specific Bridge records 340 and Vendor-specific Chassis records 342.

Vendor-specific Bridge records 340 include information pertaining to the static attributes of bridges made by a specific vendor. Each Vendor-specific Bridge record specifies a particular Bridge and is linked to the Device Type records which represent the specified Bridge. Preferably, each Vendor-specific bridge record includes data for the fields shown in Table 17.

TABLE 17

| Field | Description |
| --- | --- |
| ulDyRcDBID | This provides the database ID of the record that contains the dynamic information pertaining to the bridge |
| ulStInstDBID | This database ID uniquely identifies the instance of this record |
| abyBridgeTypeObj1D[ ] | The object Id of the bridge type |
| byBridgeTypeVal | The bridge type identifier value (as enumerated in the MIB) |
| szBridgeDesc[ ] | A description of the bridge |
| wMaxPortCount | The maximum number of ports supported by the bridge |

Vendor-specific Chassis records 342 include information pertaining to the static attributes of the chassis of a specific vendor. Each Vendor-specific Chassis record specifies a particular chassis and is linked to the Device Type records which represent the specified chassis. Preferably, each Vendor-specific Chassis record includes data for the fields shown in Table 18.

TABLE 18

| Field | Description |
| --- | --- |
| ulDyRcDBID | This provides the database ID of the record that contains the dynamic information pertaining to the chassis |
| ulStInstDBID | This database ID uniquely identifies the instance of this record |
| abyChassisTypeObjID[ ] | the chassis type object identifier |
| wChassisTypeVal | the value of the chassis type obj ID |
| abyBkplnType[ ] | A description of the backplane type |
| wBklnTypeVal | the value of the backplane type Object ID |
| szChassisBkplnRev[ ] | Provides the revision number associated with the chassis backplane |
| szChassisSymName[ ] | The name of the symbol used to represent this chassis |
| szChassisDesc[ ] | A description of the chassis |
| byDeviceType | A value that uniquely indicates the type of a device |
| ulPowerSupplyID | An identifier associated with the power supply |

Static Interface Information records 332 include information pertaining to the static attributes of various types of interfaces. In the presently preferred embodiment, Static Interface Information records 332 included Vendor-specific TRNMM records 344 and Vendor-specific EnetNMM records 346.

Vendor-specific TRNMM records 344 include information pertaining to token ring NMMs. Each Vendor-specific TRNMM record specifies a particular token ring NMM and is linked to the Interface records and InterfaceType records which represent interfaces and interface types corresponding to the specified token ring NMM. Preferably, each Vendor-specific TRNMM record includes data for the fields shown in Table 19.

TABLE 19

| Field | Description |
| --- | --- |
| ulDyRcDBID | Database identifier |
| ulStInstDBID | This database ID uniquely identifies the instance of this record |
| ulFPRevID | The Frame processor ID |
| abyModuleTypeObjID[ ] | The module type object ID |
| wModuleType | A value that uniquely identifies the particular module type |
| ulModuleID | An identifier for the module |
| ulMDAID | A media dependent identifier |
| ulRevID | The revision identifier for the module |

Vendor-specific EnetNMM records 346 include information pertaining to Ethernet NMMs. Each Vendor-specific EnetNMM record specifies a particular Ethernet NMM and is linked to the Interface records and InterfaceType records which represent interfaces and interface types corresponding to the specified Ethernet NMM. Preferably, each Vendor-specific EnetNMM record includes data for the fields shown in Table 20.

TABLE 20

| Field | Description |
| --- | --- |
| ulDyRcDBID | The database ID that associates this record to the record containing "dynamic information" |
| ulStInstDBID | This database ID uniquely identifies the instance of this record |
| abyModuleTypeObjID[ ] | The module type object ID |
| wModuleType | the value of the module type object ID |
| ulModuleID | The value of the module ID object identifier |
| ulMDAID | A media dependent identifier |
| ulRevID | The revision identifier for the module |

Dynamic Device Information records 336 are used to store any information obtained about devices which cannot be identified using the information in the static records for the various device types. Each Dynamic Device Information record is linked to a corresponding device record or static device information record. Preferably, each Dynamic Device Information record includes data for the fields shown in Table 21.

TABLE 21

| Field | Description |
| --- | --- |
| ulStInstDBID | A database ID that associates the record with the record containing static information |
| ulDyInstDBID | This database ID uniquely identifies the the instance of this record |
| abyChassisTypeObjID[40] | The chassis type |
| byChassisTypeVal | The value of the chassis type obj ID |
| abyBkplnTypeObjID[40] | A description of the backplane type |

TABLE 21-continued

| Field | Description |
| --- | --- |
| byBkplnTypeVal | A value that uniquely identifies the backplane type associated with the device |
| byBridgeTypeVal | The bridge type identifier (as enumerated in the MIB) |
| szDevType[40] | Information on the kind of devices we know it is (e.g. BOX, Bridge . . . ). Null if not known |
| byDeviceType | A value that uniquely indicates the type of the device |

Dynamic Interface Information records 338 are used to store any information obtained about interfaces which cannot be identified using the information in the static records for the various interface types. Each Dynamic Interface Information record is linked to a corresponding interface record or static interface information record. Preferably, each Dynamic Interface Information record includes data for the fields shown in Table 22.

TABLE 22

| Field | Description |
| --- | --- |
| ulDyInstDBID | This database ID uniquely identifies the instance of this record |
| abyModuleTypeObjID[ ] | The module type object ID |
| wModuleType | An identifier of the type of module |
| ulModuleId | An identifier for the module |
| ulMDAID | A media dependent identifier |
| ulRevID | The revision identifier for the module |

While specific embodiments of the present invention have been described, various modifications and substitutions will become apparent to one skilled in the art by this disclosure. Such modifications and substitutions are within the scope of the present invention, and are intended to be covered by the following claims.

What is claimed is:

1. An apparatus for providing connectivity information about a network, said network including a plurality of devices, the apparatus comprising:

a storage device;

a plurality of physical connectivity records stored on said storage device, said plurality of physical connectivity records including:

1) a plurality of device records, wherein each device record of said plurality of device records uniquely represents a physical device on said network, 2) a plurality of physical connection records, wherein each physical connection record of said plurality of physical connection records represents a physical line;

a plurality of pointers connecting said plurality of device records of said plurality of physical connection records, wherein said pointers connect each device record of said plurality of device records to the physical connections records of said plurality of physical connection records connected;

a plurality of logical connectivity records stored on said storage device, said plurality of logical connectivity records representing logical devices that correspond to said plurality of devices;

said storage access unit coupled to said storage device, said storage access unit coupled to receive a request for connectivity information, said request being a request for physical connectivity information or logical connectivity information;

said storage access unit acccessing said plurality of physical connectivity records on said storage device and generating a signal containing physical connectivity information when said request is a request for physical connectivity information; and said storage access unit accessing said containing of logical connectivity records on said storage device and generating a signal containing logical connectivity information when said request is a request for logical connectivity information.

2. The apparatus of claim 1 wherein said network includes a plurality of interfaces, each interface of said plurality of interfaces belonging to a corresponding device of said plurality of devices, said physical connectivity records including a plurality of interface records, each interface record of said plurality of interface records representing a specified interface of said plurality of interfaces.

3. The apparatus of claim 2 wherein said plurality of pointers includes a plurality of device-to-interface pointers, said plurality of device-to-interface pointers linking said plurality of device records to said plurality of interface records, each device-to-interface pointer linking a given device record to a given interface record to indicate that an interface of said plurality of interfaces represented by said given interface record belongs to a device of said plurality of devices represented by said given device record.

4. The apparatus of claim 3 wherein said plurality of pointers includes a plurality of interface-to-link pointers, each interface-to-link pointers of said plurality of interface-to-link pointers linking a given interface record of said plurality of interface records to a given physical connection record of said plurality of physical connection record to indicate that said given interface record represents an interface of said plurality of interfaces connected to a physical line represented by said given physical connection record.

5. The apparatus of claim 4 wherein said connected set of interfaces includes an upstream interface and a downstream interface;

said upstream interface being represented by a first interface record of said plurality of interface records;

said downstream interface record being represented by a second interface record of said plurality of interface records;

said plurality of interface-to-link pointers including a plurality of link-to pointers and a plurality of link-from pointers;

said each physical connection record being associated with said first interface record by a link-from pointer of said plurality of link-from pointers; and said each physical connection record being associated with said second interface record by a link-to pointer of said plurality of link-to pointers.

6. The apparatus of claim 2 further comprising:

a plurality of interface type records stored on said storage device, each interface type record representing a particular type interface;

a plurality of interface-to-interface-type pointers, said plurality of interface-to-interface-type pointers linking said plurality of interface records to said plurality of interface type records, wherein a given interface record is linked to a given interface type record by an interface to interface type pointer if the interface represented by said interface record is of the interface type represented by said interface type record.

7. The apparatus of claim 1 wherein said plurality of logical connectivity records include a plurality of view records, each view record corresponding to a logical view of the network.

8. The apparatus of claim 7 wherein said logical connectivity records further include a plurality of view device records, each view device record being associated with a corresponding view record, each view device record containing an index of interfaces which exist in a logical view of the network represented by said corresponding view record.

9. The apparatus of claim 1 further including an NMS (Network Management Station) application unit for executing one or more of a plurality of NMS applications, said NMS application unit being coupled to said storage access unit, said one or more NMS applications generating said request for connectivity information.

10. The apparatus of claim 1 further including a connectivity derivation unit coupled to said storage access unit, said connectivity derivation unit receiving station status information and generating physical connectivity information based on said status information.

11. The apparatus of claim 10 wherein said connectivity derivation unit transmits said physical connectivity information to said storage access unit, said storage access unit generating said plurality of physical connectivity records responsive to said physical connectivity information, said storage access unit storing said plurality of physical connectivity records on said storage device.

12. The apparatus of claim 11 further including an information access unit coupled to said storage access unit, said information access unit accessing said network to acquire said station status information when said connectivity information requested in said request for connectivity information is not presently represented in either said plurality of physical connectivity records or plurality of logical connectivity records.

13. The apparatus of claim 1 further comprising:
a plurality of device type records stored on said storage device, each device type record representing a particular type of device;
a plurality of device-to-device-type pointers, said plurality of device-to-device-type pointers linking said plurality of device records to said plurality of device type records, wherein a given device record is linked to a given device type record by a device-to-device-type pointer if the device represented by said device record is of the device type represented by said device type record.

14. A method for providing connectivity information about a network, said network including a plurality of devices, the method comprising the computer-implemented steps of:
storing a plurality of physical connectivity records on a storage device, including the steps of:
1) storing a plurality of device records, wherein each device record of said plurality of device records uniquely represents a physical device on said network,
2) storing a plurality of physical connection records, wherein each physical connection record of said plurality of physical connection records represents a physical line;
storing a plurality of pointers connecting said plurality of device records to said plurality of physical connection records wherein said pointers connect each device record of said plurality of device records to the physical connection records of said plurality of physical connection records that represent the physical lines to which the device represened by the device record is physically connected;
storing a plurality of logical connectivity records on said storage device, said plurality of logical connectivity records representing logical devices that correspond to said plurality of devices;
receiving a request for connectivity information, said request being a request for physical connectivity information or logical connectivity information;
accessing said plurality of physical connectivity records on said storage device and generating a signal containing physical connectivity information when said request is a request for physical connectivity information; and
accessing said plurality of logical connectivity records on said storage device and generating a signal containing logical connectivity information when said request is a request for logical connectivity information.

15. The method of claim 14 wherein said network includes a plurality of interfaces, each interface of said plurality of interfaces belonging to a corresponding device of said plurality of devices, said step of storing said plurality of physical connectivity records including
storing a plurality of interface records, each interface record of said plurality of interface records representing a specified interface of said plurality of interfaces.

16. The method of claim 15 wherein said step of storing said plurality of pointers includes the step of storing a plurality of device-to-interface pointers, said plurality of device-to-interface pointers linking said plurality of device records to said plurality of interface records, each device-to-interface pointer linking a given device record to a given interface record to indicate that an interface of said plurality of interfaces represented by said given interface record belongs to a device of said plurality of devices represented by said given device record.

17. The method of claim 16 wherein said step of storing said plurality of pointers includes the step of storing a plurality of interface-to-link pointers, each interface-to-link pointers of said plurality of interface-to-link pointers linking a given interface record of said plurality of interface records to a given physical connection record of said plurality of physical connection records to indicate that said given interface record represents an interface of said plurality of interfaces connected to a physical line represented by said given physical connection record.

18. The method of claim 17 wherein said step of storing said plurality of interface-to-link pointers includes the steps of:
storing a plurality of link-to pointers and
storing a plurality of link-from pointers,
said connected set of interfaces including an upstream interface and a downstream interface;
said upstream interface being represented by a first interface record of said plurality of interface records;
said downstream interface record being represented by a second interface record of said plurality of interface records;
said each physical connection record being associated with said first interface record by a link-from pointer of said plurality of link-from pointers; and said each physical connection record being associated with said second interface record by a link-to pointer of said plurality of link-to pointers.

19. The method of claim 15 further comprising the steps of:
   storing a plurality of interface type records stored on said storage device, each interface type record representing a panticular type of interface;
   storing a plurality of interface-to-interface-type pointers, said plurality of interface-to-interface-type pointers linking said plurality of interface records to said plurality of interface type records, wherein a given interface record is linked to a given interface type record by an interface-to-interface-type pointer if the interface represented by said interface record is of the interface type represented by said interface type record.

20. The method of claim 14 wherein said step of storing said plurality of logical connectivity records includes the step of storing a plurality of view records, each view record corresponding to a logical view of the network.

21. The method of claim 20 wherein said step of storing said logical connectivity records further includes the step of storing a plurality of view device records, each view device record being associated with a corresponding view record, each view device record containing an index of interfaces which exist in a logical view of the network represented by said corresponding view record.

22. The method of claim 14 further including the steps of causing an NMS (Network Management Station) application to generate said request for connectivity information.

23. The method of claim 14 further including the steps of receiving station status information and generating physical connectivity information based on said status information.

24. The method of claim 23 further including the step of generating said plurality of physical connectivity records responsive to said physical connectivity information.

25. The method of claim 24 further including the steps of accessing said network to acquire said station status information when said connectivity information requested in said request for connectivity information is not presently represented in either said plurality of physical connectivity records or said plurality of logical connectivity records.

26. The method of claim 14 further comprising the steps of:
   storing a plurality of device type records on said storage device, each device type record representing a particular type of device;
   storing a plurality of device-to-device-type pointers, said plurality of device-to-device-type pointers linking said plurality of device records to said plurality of device type records, wherein a given device record is linked to a given device type record by a device-to-device-type pointer if the device represented by said device record is of the device type represented by said device type record.

* * * * *

UNITED STATES PATENT AND TRADEMARK OFFICE
CERTIFICATE OF CORRECTION

PATENT NO. : 6,061,505
DATED : May 9, 2000
INVENTOR(S) : Pitchaikani et al.

It is certified that error appears in the above-identified patent and that said Letters Patent is hereby corrected as shown below:

Column 17,
Line 19, please delete "connections" and insert -- connection --
Line 20, after "records" please insert -- that represent the physical lines to which the device represented by the device record is physically --.
Line 25, please delete first "said" and insert -- a --.

Column 18,
Line 35, please delete "containing" and insert -- plurality --.

Signed and Sealed this

Thirteenth Day of July, 2004

JON W. DUDAS
*Acting Director of the United States Patent and Trademark Office*